(12) United States Patent
Yu et al.

(10) Patent No.: US 8,966,031 B2
(45) Date of Patent: *Feb. 24, 2015

(54) METHOD FOR ADDRESSING MANAGEMENT OBJECT IN MANAGEMENT TREE AND ASSOCIATED DEVICE MANAGEMENT SYSTEM

(71) Applicant: HTC Corporation, Taoyuan, Taoyuan County (TW)

(72) Inventors: Chun-Ta Yu, Taoyuan (TW); Yin-Yeh Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,869

(22) Filed: Jun. 2, 2014

(65) Prior Publication Data
US 2014/0280858 A1    Sep. 18, 2014

Related U.S. Application Data

(63) Continuation of application No. 12/897,960, filed on Oct. 5, 2010, now Pat. No. 8,775,579.

(60) Provisional application No. 61/294,492, filed on Jan. 13, 2010.

(51) Int. Cl.
*G06F 15/177* (2006.01)
*G06F 15/173* (2006.01)
(Continued)

(52) U.S. Cl.
CPC ............ *H04L 61/20* (2013.01); *H04L 41/0206* (2013.01); *H04L 41/0213* (2013.01); *H04L 41/0233* (2013.01); *H04W 4/00* (2013.01)
USPC ..... 709/221; 709/220; 709/224; 707/E17.014

(58) Field of Classification Search
USPC ............................ 709/220–224; 707/E17.04
See application file for complete search history.

(56) References Cited

U.S. PATENT DOCUMENTS

2005/0010585 A1*  1/2005  Sahinoja et al. ............... 707/100
2007/0174444 A1*  7/2007  Kim et al. ..................... 709/223
(Continued)

FOREIGN PATENT DOCUMENTS

EP          2051441 A1      4/2009

OTHER PUBLICATIONS

"OMA Device Management Tree and Description", Version 1.2.1—Jun. 17, 2008, OMA-TS-DM TND-V1 2 1-20080617-A.*
(Continued)

*Primary Examiner* — Wing F Chan
*Assistant Examiner* — Raji Krishnan
(74) *Attorney, Agent, or Firm* — Birch, Stewart, Kolasch & Birch, LLP

(57) ABSTRACT

A method for addressing a management object in a management tree of a device management (DM) client and an associated DM system are disclosed to solve the issues encountered in the relative universal resource identifier (URI) addressing of the OMA DM protocol. The method comprises receiving a relative URI including a first part from a DM server, and identifying a root node of the management object according to the first part. The first part comprises a URI parameter for specifying a root node of a sub-tree of the management tree for finding the management object, a management object identifier, and a plurality of attribute conditions for specifying values of a plurality of leaf nodes directly under the root node of the management object.

4 Claims, 6 Drawing Sheets

(51) Int. Cl.
  *G06F 17/30* (2006.01)
  *H04L 29/12* (2006.01)
  *H04L 12/24* (2006.01)
  *H04W 4/00* (2009.01)

(56) References Cited

U.S. PATENT DOCUMENTS

2007/0256048 A1    11/2007   Relyea et al.
2007/0299977 A1    12/2007   Markel et al.
2009/0094363 A1*    4/2009   He et al. ........................ 709/224
2009/0204578 A1*    8/2009   Dang ................................ 707/3

OTHER PUBLICATIONS

Open Mobile Alliance: "OMA Device Management Protocol Draft Version 1.3"; vol. Draft Version 1.3; (Dec. 29, 2009), pp. 1-57, XP002634199, OMA-TS-DM_Protocol-V1_3-20091229-D.*

Bernal J.F.M. et al.: "A Web-Based Application to Verify Open Mobile Alliance Device Management Specifications"; First International Conference on Advances in System Testing and Validation Lifecycle, 2009, Valid '09., (Sept. 20, 2009), pp. 13-18, XP031542423.*

"OMA Device Management Tree and Description", Version 1.2.1—Jun. 17, 2008, OMA-TS-DM_TND-V1_2_1-20080617-A.pdf, pp. 1-48.

Bernal J.F.M. et al.: "A Web-Based Application to Verify Open Mobile Alliance Device Management Specifications"; First International Conference on Advances in System Testing and Validation Lifecycle, 2009, Valid '09., (Sep. 20, 2009), pp. 13-18, XP031542423.

Open Mobile Alliance: "OMA Device Management Protocol Draft Version 1.3"; vol. Draft Version 1.3; (Dec. 29, 2009), pp. 1-57, XP002634199.

* cited by examiner

METHOD FOR ADDRESSING MANAGEMENT OBJECT IN MANAGEMENT TREE AND ASSOCIATED DEVICE MANAGEMENT SYSTEM

CROSS-REFERENCE TO RELATED APPLICATION

This application is a continuation of co-pending U.S. patent application Ser. No. 12/897,960 filed on Oct. 5, 2010, which claims the benefit of U.S. Provisional Application No. 61/294,492 filed on Jan. 13, 2010, the entire contents of all of the above applications are hereby incorporated by reference.

BACKGROUND OF INVENTION

1. Field of the Invention

The present invention relates to device management (DM), and more particularly to a method for addressing a management object in a management tree and an associated DM system.

2. Description of the Prior Art

In OMA (Open Mobile Alliance) DM (Device Management) protocol specification, when a DM server is to manage a management object (MO) of a DM client, the DM server will send addressing information to the DM client for addressing the MO in the management tree of the DM client. There are two types of addressing information: absolute universal resource identifier (URI) and relative URI. When the relative URI is received, the DM client performs an address translation to convert the relative URI into the absolute URI. In the OMA DM protocol, the relative URI contains two parts:

(1) Part A: This part is used to identify the root node of the MO to be managed. According to the part A, the DM client resolves the path which begins from the root of the management tree to the root node of the MO.

(2) Part B: This part is used to identify a target node within the MO. According to the part B, the DM client resolves the path which begins from below the root node of the MO to the target node.

The part A of the conventional relative URI can be defined as "URI?MOID=value&attribute=value", and the description for each element therein is given below:

(a) URI: The URI parameter specifies a root node of a sub-tree of the management tree for finding the MO. That is, the DM client will find the MO occurrences in the whole sub-tree with the root node specified by the URI parameter. The URI parameter should be included in the relative URI addressing.

(b) ?: This element is used as the separator between the URI parameter and MOID, and must be included in the relative URI addressing only when the URI parameter is present.

(c) MOID=value: This element is the MO identifier used to specify the MO to be managed, and must be included in the relative URI addressing.

(d) &: This element is used as the separator between the MOID and the attribute condition, and may be included in the relative URI addressing.

(e) attribute=value: This element is used only when the DM server anticipates that multiple MO occurrences will be found. The 'attribute' identifies a specific leaf node directly under the root of the MO, and the 'value' identifies the value of the specific leaf node (in this specification, the leaf node means a node without any child node of its own). This element is used by the DM client to find the unique MO occurrence to be managed. If this element is specified, the preceding '&' must be specified as well.

According to the specified MO identifier, the DM client will find all the MO occurrences in the whole sub-tree beginning from the URI parameter. In case there are multiple MO occurrences found and the element "attribute=value" is provided by the DM server, the DM client uses the "attribute=value" to resolve the root node of the unique MO occurrence to be managed, as shown in the example of FIG. 1. In FIG. 1, the DM server wants to manipulate the node './A1/B/E'. The part A sent by the DM server is ".?[urn:oma:mo:oma_personal_data:1.0]&C='Phone'". The part B sent by the DM Server is "B/E". The resolved URI from the part A is "./A1" and the part B is "B/E". Therefore, the actual URI of the node E is "./A1/B/E". Then, the DM client is able to execute the node "./A1/B/E" as expected by the DM server.

However, there are several issues encountered when the above syntax definition of the conventional relative URI is used. The first issue is that, as described above, the element "attribute=value" is used to specify the unique MO occurrence in the management tree of the DM client, but when the number of MOs in the management tree increases, the element "attribute=value" may not be enough to specify the unique MO occurrence, as shown in the example of FIG. 2. In FIG. 2, there are three MOs under the root of the management tree. If the DM server wants to specify the ./A1/B/E, the relative URI will be ".?[urn:oma:mo:oma_personal_data:1.0]&C='Phone'" or ".?[urn:oma:mo:oma_personal_data:1.0]&D='Contact'". Since both A1 and A3 have the leaf node C with the same value 'Phone', ".?[urn:oma:mo:oma_personal_data:1.0]&C='Phone'" cannot be used to specify a unique MO occurrence. Similarly, since both A1 and A2 have the leaf node D with the same value 'Contact', ".?[urn:oma:mo:oma_personal_data:1.0]&D='Contact'" cannot also be used to specify a unique MO occurrence. In this situation, the DM server won't have a relative URI to specify the node "./A1/B/E".

The second issue is that when there is no leaf node directly under the root node of the MO, as shown in FIG. 3 (i.e. there is no leaf node under any of A1~A3), the element "attribute=value" in the part A cannot be assigned by nature in the relative URI. Thus, in this situation, when the DM server wants to manage a MO and anticipates that multiple MO occurrences will be found in the management tree, the DM server can't use the conventional relative URI to specify the unique MO.

SUMMARY OF INVENTION

It is therefore one objective of the present invention to provide a method for addressing a management object in a management tree and an associated device management (DM) system, thereby solving the issues encountered in the relative universal resource identifier (URI) addressing of the OMA DM protocol.

In one embodiment of the present invention, a method for addressing a management object in a management tree of a DM client is provided. The method comprises: receiving a relative URI from a DM server, wherein the relative URI comprises a first part; and identifying a root node of the management object according to the first part, wherein the first part comprises a URI parameter for specifying a root node of a sub-tree of the management tree for finding the management object, a management object identifier, and a plurality of attribute conditions for specifying values of a plurality of leaf nodes directly under the root node of the management object.

In another embodiment of the present invention, a method for addressing a management object in a management tree of a DM client is provided. The method comprises: receiving a relative URI from a DM server, wherein the relative URI comprises a first part; and identifying a root node of the management object according to the first part, wherein the first part comprises a URI parameter for specifying a root node of a sub-tree of the management tree for finding the management object, a management object identifier, an attribute condition for specifying a value of a leaf node directly under the root node of the management object, and a time condition for specifying a time sequence between a time stamp of the leaf node and a reference time point.

In another embodiment of the present invention, a method for addressing a management object in a management tree of a DM client is provided. The method comprises: receiving a URI from a DM server, wherein the relative URI comprises a first part; and identifying a root node of the management object according to the first part, wherein the first part comprises a URI parameter for specifying a root node of a sub-tree of the management tree for finding the management object, a management object identifier, and an attribute condition for specifying a path from below the root node of the management object to a leaf node within the management object and a value of the leaf node.

In another embodiment of the present invention, a DM server for addressing a management object in a management tree of a DM client is provided. The DM server comprises: a generating unit for generating a relative universal resource identifier (URI), wherein the relative URI comprises a first part for identifying a root node of the management object; and a transmitting unit for transmitting the relative URI to the DM client; wherein the first part comprises a URI parameter for specifying a root node of a sub-tree of the management tree for finding the management object, a management object identifier, and a plurality of attribute conditions for specifying values of a plurality of leaf nodes directly under the root node of the management object.

In another embodiment of the present invention, a DM server for addressing a management object in a management tree of a DM client is provided. The DM server comprises: a generating unit for generating a relative universal resource identifier (URI), wherein the relative URI comprises a first part for identifying a root node of the management object; and a transmitting unit for transmitting the relative URI to the DM client; wherein the first part comprises a URI parameter for specifying a root node of a sub-tree of the management tree for finding the management object, a management object identifier, an attribute condition for specifying a value of a leaf node directly under the root node of the management object, and a time condition for specifying a time sequence between a time stamp of the leaf node and a reference time point.

In another embodiment of the present invention, a DM server for addressing a management object in a management tree of a DM client is provided. The DM server comprises: a generating unit for generating a relative universal resource identifier (URI), wherein the relative URI comprises a first part for identifying a root node of the management object; and a transmitting unit for transmitting the relative URI to the DM client; wherein the first part comprises a URI parameter for specifying a root node of a sub-tree of the management tree for finding the management object, a management object identifier, and an attribute condition for specifying a path from below the root node of the management object to a leaf node within the management object and a value of the leaf node.

DETAILED DESCRIPTION

Figure 4:
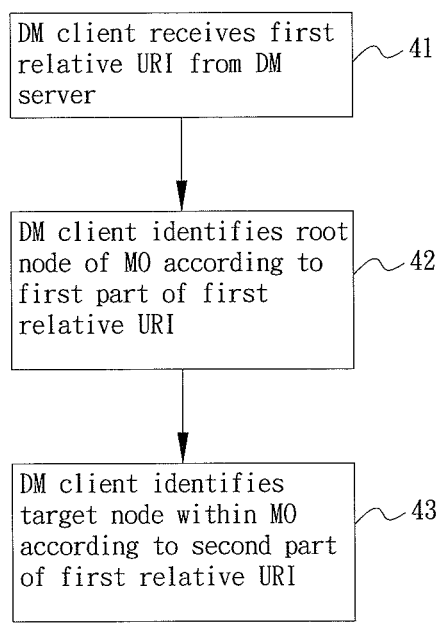
FIG. 4 is a flow chart of a method for addressing a management object in a management tree of a DM client according to the first embodiment of the present invention.

Reference will now to be made in detail to embodiments of the present invention, which are illustrated in the accompanying drawings. FIG. 4 is a flow chart of a method for addressing a management object (MO) in a management tree of a device management (DM) client according to the first embodiment of the present invention. The DM client can be a mobile device such as a mobile phone, PDA, portable computer, etc. The first embodiment can solve the first issue of the OMA DM protocol as mentioned above by adding one or more attribute condition to the part A of the conventional relative URI. In step 41, the DM client receives a first relative URI from a DM server. Both the DM server and the DM client can support the OMA DM protocol. The first relative URI comprises a first part and a second part. The first part comprises a URI parameter for specifying the root node of a sub-tree of the management tree for finding the MO, a MO identifier, and a plurality of attribute conditions for specifying the values of a plurality of leaf nodes directly under the root node of the MO (i.e. the leaf nodes are direct leaf nodes of the root node). The URI parameter sets the range (i.e. the sub-tree with the root node specified by the URI parameter) for finding the MO; the MO identifier is used to specify the MO to be addressed and managed; the attribute conditions can be used to identify a unique one out of multiple MO occurrences, as described later. The second part specifies a path from below the root node of the MO to a target node within the MO (i.e. the path can start from an internal node under the root node of the MO).

Figure 1:
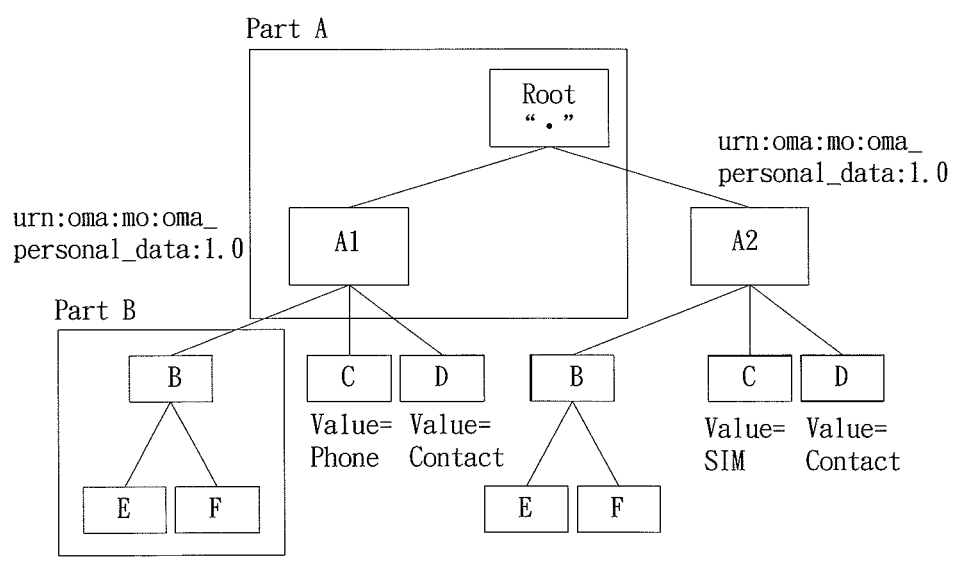
FIG. 1 shows an example for the relative URI addressing.
Figure 2:
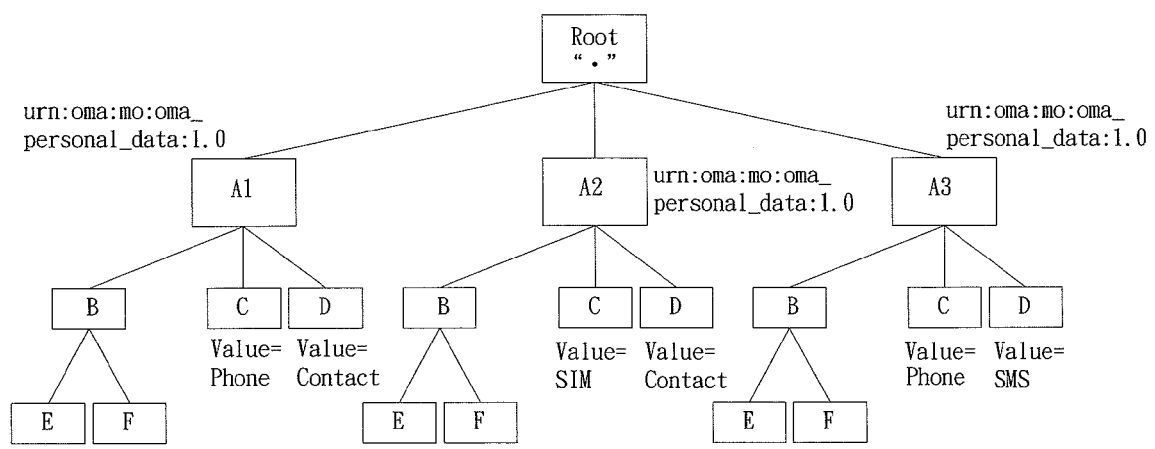
FIG. 2 shows another example for the relative URI addressing.

In step 42, the DM client identifies the root node of the MO according to the first part of the first relative URI. The first part can be considered as a modification to the part A of the conventional relative URI. For example, the first part can be represented as "URI?MOID=value&attribute=value+attribute=value", where '+' is used to concatenate the attribute conditions. It should be noted here that the symbol '+' is just an example and can be replaced by any other suitable symbol or expression. If more than two attribute conditions are used, all the attribute conditions are concatenated by '+', e.g. "URI?MOID=value&attribute=value+attribute=value+attribute=value" for the case of three attribute conditions. The DM client will identify the root node of a unique MO occurrence which satisfies all the attribute conditions in the first part. For example, in FIG. 2, the first part ".?[urn:oma:mo:oma_personal_data:1.0]&C='Phone'+D='Contact'" can be used to identify the MO with the root node A1.

In step 43, the DM client identifies the target node within the MO according to the second part, since the root node of the MO is identified in step 42 and the second part provides the path from below the root node of the MO to the target node. The second part is similar to the part B of the conventional relative URI.

Thus, the DM client can address the MO by executing step 42, and further identify the target node within the MO by executing step 43.

Figure 5:
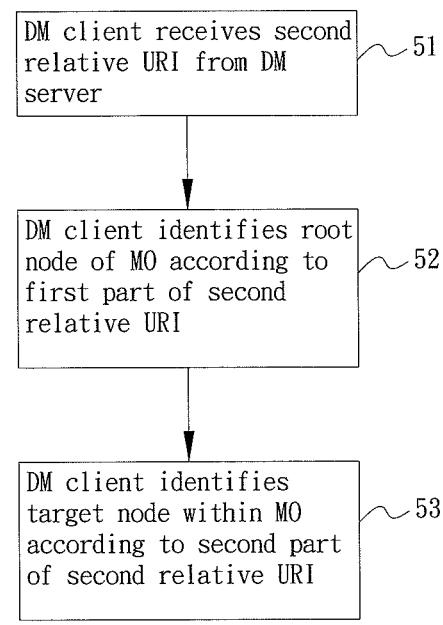
FIG. 5 is a flow chart of the method for addressing the management object in the management tree of the DM client according to the second embodiment of the present invention.

FIG. 5 is a flow chart of the method for addressing the MO in the management tree of the DM client according to the second embodiment of the present invention. The second embodiment can solve the first issue of the OMA DM protocol as mentioned above by adding a time condition to the part A of the conventional relative URI. In step 51, the DM client receives a second relative URI from a DM server. The second relative URI comprises a first part and a second part, where the first part comprises a URI parameter, a MO identifier, an attribute condition and a time condition. The URI parameter, the MO identifier and the attribute condition are similar to those of the first part of the first relative URI. The time condition is used to specify a time sequence between a time stamp of the leaf node specified by the attribute condition and a reference time point. The second part is similar to that of the first relative URI.

In step 52, the DM client identifies the root node of the MO according to the first part of the second relative URI, which can be considered as a modification to the part A of the conventional relative URI. For example, the first part of the second relative URI can be represented as "URI?MOID=value&attribute=value&timecondition=value", where in the element "timecondition=value", 'timecondition' represents one of the following time operations: 'timeB', 'timeBE', 'timeL', 'timeLE' and 'timeE', and 'value' represents the reference time point. Below is the definition of the time operations: 'timeB' means "time bigger than", 'timeBE' means "time bigger than or equal to", 'timeL' means "time less than", 'timeLE' means "time less than or equal to", and 'timeE' means "time equal to". The reference time point can be represented as a UTC (Coordinated Universal Time) time in an ISO8601 basic format, e.g. 20010711T163817Z means Jul. 11, 2001 at 16 hours, 38 minutes and 17 seconds. Thus, the element "timecondition=value" can be used to specify the time sequence between the time stamp of the leaf node specified by the attribute condition and the reference time point. For example, if the modified part A is ".?[urn:oma:mo:oma_personal_data:1.0]&C='Phone' &timeBE=20090711T160000Z", the DM client will identify the MO which has the MO identifier [urn:oma:mo:oma_personal_data:1.0] and a direct leaf node C of the root with the value 'phone' and also the time stamp of this node C is bigger than (i.e. later than) or equal to Jul. 11, 2009 at 16 hours, 0 minutes and 0 seconds.

In step 53, according to the second part of the second relative URI, the DM client identifies a target node within the MO identified in step 52. Thus, the DM client can address the MO by executing step 52, and further identify the target node within the MO by executing step 53.

In the third embodiment of the present invention, the first and second embodiments are combined to make a further modification to the part A of the conventional relative URI, which can be represented as "URI?MOID=value&attribute=value+attribute=value&timecondition=value". For example, if the modified part A is ".?[urn:oma:mo:oma_personal_data:1.0] &C='Phone'+D='Contact' &timeL =20090711T160000Z", the DM client will identify the MO which has the MO identifier [urn:oma:mo:oma_personal_data:1.0], a direct leaf node C of the root with the value 'Phone' and a direct leaf node D of the root with the value 'Contact', and also the time stamp of at least one of the nodes C and D is less than (i.e. earlier than) Jul. 11, 2009 at 16 hours, 0 minutes and 0 seconds.

In sum, all of the first, second and third embodiments can improve the capability of the relative URI to address a unique MO occurrence in the management tree by means of adding one or more conditions into the part A of the conventional relative URI.

Figure 6:
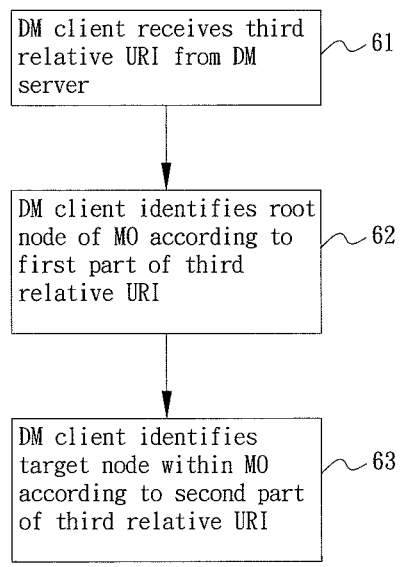
FIG. 6 is a flow chart of the method for addressing the management object in the management tree of the DM client according to the third embodiment of the present invention.

FIG. 6 is a flow chart of the method for addressing the MO in the management tree of the DM client according to the fourth embodiment of the present invention. The fourth embodiment can solve the second issue of the OMA DM protocol as mentioned above by modifying the attribute condition in the part A of the conventional relative URI. In step 61, the DM client receives a third relative URI from the DM server. The third relative URI comprises a first part and a second part, where the first part comprises a URI parameter, a MO identifier and a modified attribute condition. The URI parameter and the MO identifier are similar to those of the first part of the first relative URI. The modified attribute condition is used to specify a path from below the root node of the management object to a leaf node within the management object (e.g. a leaf node not directly under the root node of the management object) and the value of the leaf node. The second part is similar to that of the first relative URI.

Figure 3:
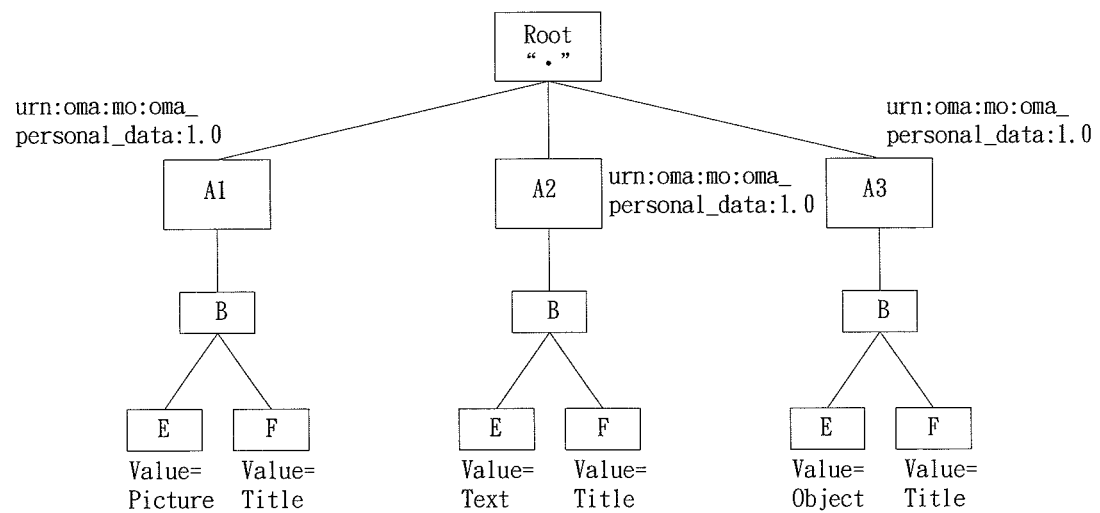
FIG. 3 shows another example for the relative URI addressing.

In step 62, the DM client identifies the root node of the MO according to the first part of the third relative URI, which can be considered as a modification to the part A of the conventional relative URI. For example, the first part of the third relative URI can be represented as "URI?MOID=value&attribute'=value", where "attribute'=value" represents the modified attribute condition. The modified attribute condition is used when the DM server anticipates that multiple MO occurrences will be found in the management tree and also there is no leaf node directly under the roots of the multiple MO occurrences. The DM client will identify the root node of a unique MO occurrence which has the leaf node and the corresponding value specified in the modified attribute condition. For example, in FIG. 3, the modified part A ".?[urn:oma:mo:oma_personal_data:1.0] &B/E=Picture" can be used to specify the MO with the root node A1.

In step 63, according to the second part of the third relative URI, the DM client identifies a target node within the MO identified in step 62. Thus, the DM client can address the MO by executing step 62, and further identify the target node within the MO by executing step 63.

In the fourth embodiment, the first part of the third relative URI can be extended to include two or more modified attribute conditions. For example, the first part of the third relative URI can be represented as "URI?MOID=value&attribute'=value+attribute'=value+ . . . ", where '+' is used to concatenate the modified attribute conditions. It should be noted here that the symbol '+' is just an example and can be replaced by any other suitable symbol or expression. Then, the DM client will identify the root node of the unique MO occurrence which has the leaf nodes and the corresponding values specified in all the modified attribute conditions.

In the fifth embodiment of the present invention, the second and fourth embodiments are combined to make a further modification to the part A of the conventional relative URI, which can then be represented as "URI?MOID=value&attribute'=value&timecondition=value". For example, if the modified part A is ".?[urn:oma:mo:oma_personal_data:1.0]&B/E=Picture&timeL=20090711T160000Z", the DM client will identify the MO which has the MO identifier [urn:oma:mo:oma_personal_data:1.0], a leaf node E with the path 'B/E' and the value 'Picture', and also the time stamp of the node E is less than Jul. 11, 2009 at 16 hours, 0 minutes and 0 seconds.

Figure 7:
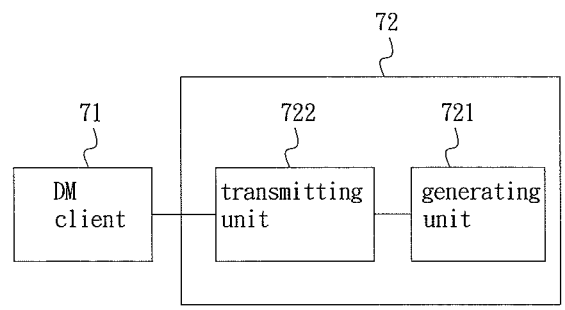
FIG. 7 shows a block diagram of an embodiment of a DM system implementing the method in FIG. 4 according to the present invention.

FIG. 7 shows a block diagram of an embodiment of a DM system implementing the method in FIG. 4 according to the present invention. As shown in FIG. 7, the DM system 70 comprises a DM client 71 and a DM server 72. The DM server 72 is for addressing a MO in a management tree of the DM client 71, and comprises a generating unit 721 and a transmitting unit 722. The generating unit 721 generates the first relative URI as described above. The transmitting unit 722 transmits the first relative URI to the DM client 71, which then identifies the root node of the MO according to the first part of the first relative URI, and identifies the target node within the MO according to the second part of the first relative URI. The detailed operation of the DM client 71 has been described with respect to FIG. 4 above.

Figure 8:
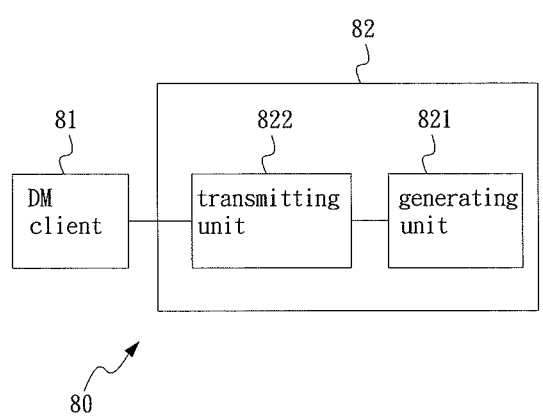
FIG. 8 shows a block diagram of an embodiment of a DM system implementing the method in FIG. 5 according to the present invention.

FIG. 8 shows a block diagram of an embodiment of a DM system implementing the method in FIG. 5 according to the present invention. As shown in FIG. 8, the DM system 80 comprises a DM client 81 and a DM server 82. The DM server 82 is for addressing a MO in a management tree of the DM client 81, and comprises a generating unit 821 and a transmitting unit 822. The generating unit 821 generates the second relative URI as described above. The transmitting unit 822 transmits the second relative URI to the DM client 81, which then identifies the root node of the MO according to the first part of the second relative URI, and identifies the target node within the MO according to the second part of the second relative URI. The detailed operation of the DM client 81 has been described with respect to FIG. 5 above.

Figure 9:
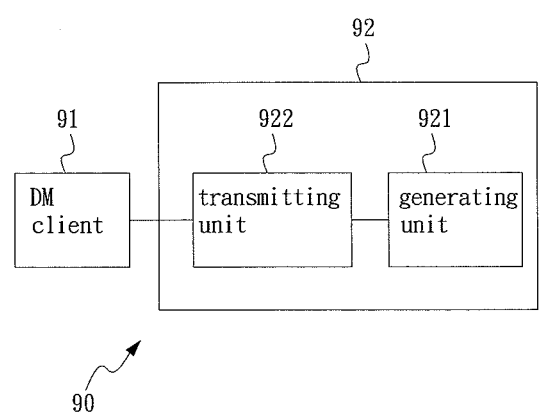
FIG. 9 shows a block diagram of an embodiment of a DM system implementing the method in FIG. 6 according to the present invention.

FIG. 9 shows a block diagram of an embodiment of a DM system implementing the method in FIG. 6 according to the present invention. As shown in FIG. 9, the DM system 90 comprises a DM client 91 and a DM server 92. The DM server 92 is for addressing a MO in a management tree of the DM client 91, and comprises a generating unit 921 and a transmitting unit 922. The generating unit 921 generates the third relative URI as described above. The transmitting unit 922 transmits the third relative URI to the DM client, which then identifies the root node of the MO according to the first part of the third relative URI, and identifies the target node within the MO according to the second part of the third relative URI. The detailed operation of the DM client 91 has been described with respect to FIG. 6 above.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A method for addressing a management object in a management tree of a device management (DM) client, the method comprising:
    a first management object located in a management tree of a device management (DM) client, wherein the first management object is under a sub-tree of the management tree and has a first root node, and there is no leaf node directly under the first root node, wherein said management tree also comprises a second management object in said sub-tree, said second management object has a second root node and the same management object identifier as the first management object, and there is no leaf node directly under the second root node;
    receiving a relative universal resource identifier (URI) from a DM server, wherein the relative URI comprises a first part; and
    identifying the first root node of the first management object according to the first part, wherein the first part comprises a URI parameter for specifying said sub-tree of the management tree for finding the first management object, a management object identifier, an attribute condition for specifying a path from below the first root node of the first management object to a first leaf node within the first management object, and a value of the first leaf node; wherein said first leaf node is not directly under the first root node.

2. The method of claim 1, wherein the relative URI further comprises a second part, the method further comprises:
    identifying a target node within the first management object according to the second part, wherein the second part specifies another path from below the first root node of the first management object to the target node.

3. The method of claim 1, wherein the first part further comprises a time condition for specifying a time sequence between a time stamp of the first leaf node and a reference time point.

4. The method of claim 3, wherein both the time stamp and the reference time point are represented as Coordinated Universal Time (UTC) times in an ISO8601 basic format.

* * * * *